United States Patent [19]

Clemens

[11] 4,012,553
[45] Mar. 15, 1977

[54] RESINOUS REPAIR PAD

[75] Inventor: Lawrence M. Clemens, Minneapolis, Minn.

[73] Assignee: Minnesota Mining and Manufacturing Company, St. Paul, Minn.

[22] Filed: July 7, 1975

[21] Appl. No.: 593,216

Related U.S. Application Data

[63] Continuation-in-part of Ser. No. 493,677, Aug. 1, 1974, abandoned, which is a continuation of Ser. No. 249,055, May 1, 1972, abandoned.

[52] U.S. Cl. ............................... 428/285; 156/272; 427/54; 428/287; 428/289; 428/290; 428/304; 428/426; 428/430; 428/474; 428/480
[51] Int. Cl.² .......................................... B05D 3/06
[58] Field of Search .......... 428/289, 375, 480, 481, 428/285, 268; 427/36, 44, 54; 156/272

[56] References Cited

UNITED STATES PATENTS

| | | | |
|---|---|---|---|
| 3,108,902 | 10/1963 | Galli et al. | 428/268 |
| 3,271,182 | 9/1966 | Varlet | 427/302 |
| 3,658,620 | 4/1972 | Hall | 156/272 |
| 3,770,491 | 11/1973 | Spoor | 428/480 |
| 3,810,816 | 5/1974 | Zachariades | 428/428 |
| 3,867,153 | 2/1975 | MacLachlan | 96/79 |

*Primary Examiner*—James J. Bell
*Attorney, Agent, or Firm*—Cruzan Alexander; Donald M. Sell; Warren R. Bovee

[57] ABSTRACT

An adherent reinforced resinous pad, consisting of a fibrous mat or fabric impregnated with a soft sticky resinous composition which hardens on exposure to ultraviolet radiation, enclosed between removable protective coverings. Resin flow is inhibited, without destroying adhesion, by controlled gelatinization.

10 Claims, No Drawings

RESINOUS REPAIR PAD

This application is a continuation in part of my copending application Ser. No. 493,677, filed Aug. 1, 1974, now abandoned, which is in turn a continuation of application Ser. No. 249,055, filed May 1, 1972 and now abandoned.

This invention relates to resinous repair pads and sheet materials.

The application of fiber-reinforced resinous coatings to various structural surfaces provides a convenient means for repairing, strengthening or protecting such surfaces. Typically a strip of glass mat or fabric is filled with a self-curing viscous resin mixture by dipping or brushing. The strip is smoothed onto the area to be covered and then permitted to cure. The resin mixture must be prepared just prior to use, i.e., by introduction of curing agent. The liquid resin flows readily and is difficult to handle, particularly when the surfaces to be covered are disposed non-horizontally. As but one example, the covering of seams or holes in metal truck bodies by such methods is particularly difficult because of the tendency of the liquid resin, or of the entire patch, to flow or slide down the vertical wall.

Attempts have also been made to substitute hard reinforced resin sheet materials for the fibrous mat impregnated with liquid resin. The fibrous mat is first filled with liquefied resinous composition which is then hardened to a relative stable non-tack stage. The resulting sheet is stiff and non-adherent at normal room and storage temperatures, but when heated becomes flexible and sticky and may be conformed and adhered to structural surfaces under moderate pressure, and then cures under continued heating. The requirements of heat and pressure make this procedure unattractive particularly for repair operations in the field.

Another form of repair material which has previously been tested is a fibrous mat impregnated with a liquid resinous composition which cures on exposure to ultraviolet. The art of curing prepregs with ultraviolet light has been known for a number of years. British patents Nos. 1,054,533 and 1,160,021 relate to this art. The application of ultraviolet light to these resin compositions causes a self-sustaining, free-radical polymerization to occur once the reaction has been initiated. One form of prepreg repair material contains substantial amounts of inert additives for minimizing viscous flow. Various high molecular weight polymers in particular have been used as flow-retarding additives for the curable resinous composition but are not fully effective in preventing exudation along the edges of pads held under prolonged storage. When applied to metal, glass, wood, plastic or other clean surfaces and then exposed to direct sunlight or to other radiation high in ultraviolet, these repair materials rapidly cure to a hard and tough state and become permanently bonded to the substrate. Strength, toughness and bond of the cured product are decreased when amounts of additives sufficient to minimize edge exudation are included.

It has now been discovered that these last-described resin-impregnated mat structures may be made still more highly resistant to resin flow, and particularly resistant to edge exudation. According to the present invention a porous, fibrous mat is impregnated with a radiation-curable sticky fluid resinous composition comprising unsaturated polyester, an unsaturated liquid monomer copolymerizable, and an acyloin photoinitiator. The resinous composition should be present in an amount sufficient to impregnate the fibrous mat and provide a sticky surface.

The porous fibrous mat which can be used in this invention are any of the known materials suitable for use in making prepregs. Woven or non-woven materials can be used. Woven glass fabrics are preferred for their reinforcing properties, however other materials such as mat of synthetic fibers such as polyester and nylon fibers can also be used with advantage where the reinforcing properties of glass are not required. The mat used should be sufficiently transparent to actinic radiation to allow the radiation to cause the resin to cure.

The mat carrying the resin is then enclosed between a transparent film and another protective supporting web. The product is then exposed to a non-reaction sustaining amount of actinic radiation which is sufficient to gelatinize, but not to rigidify, the resinous composition. Following this treatment, the resinous composition remains in a stable condition, substantially free of reaction-sustaining free radicals. The resinous composition after exposure to the radiation, exhibits a decrease in penetration value, as described hereinafter, of about one-half.

The extent of gelation can be observed by suspending the irradiated prepreg for 18 hours in a 1:1 acetone-toluene mixture and noting that at least a portion of the resinous composition swells but does not dissolve. A resinous composition which has not been irradiated will have all of the resin component removed when exposed to the acetone-toluene mixture.

Surprisingly, after the resinous composition has been irradiated as described above, no further curing takes place in the absence of further irradiation, even during prolonged periods of storage. The irradiated product retains its tackiness and conformability while still readily undergoing complete cure on further exposure to actinic radiation. Exudation of resin from the edges of pads held between protective coverings is substantially completely prevented, resulting in a degree of convenience in storage and application hitherto unknown for such pads.

Evidence of gelation of the resinous composition may be obtained by means of a simple penetration test such as will now be described. A convenient form of apparatus consists of a short metal tube or ring ground to a flat annular surface at one end supporting a weight at the other, the total weight being 1700 gm. The tube has an internal diameter of ¾ inch and a wall thickness of 1/16 inch. The rate and extent of penetration of the ring into the impregnated web under the influence of the weight is measured with a micrometer held against the upper surface of the weight. The web is sandwiched between silicone-coated paper and thin Mylar polyester film, the paper being supported at room temperature on a smooth flat rigid base and the test ring contacting the film. Under the test as described, samples of impregnated fabric prepared as in Example 2 have given penetration values of 11 mils unexposed, and 6 mils after exposure for 12 minutes, i.e., a decrease of approximately one-half.

The resinous pads of this invention can be stored for prolonged periods without adverse resin flow. The pads can be applied to a variety of substrates and cured by the further application of actinic radiation to seal or protect the substrates. Metal and fiberglass substrates can be readily repaired using the disclosed pads. Flexible film substrates such as vinyl sheets can also be required with the instant pads and in some applications, e.g. the repair of vinyl swimming pool liners, the pads can be applied and left without curing to retain flexibility.

EXAMPLE 1

A resinous solution is first prepared by mixing together

| Polyester A | 100 parts |
| --- | --- |
| Polyester B | 36 |
| Diallyl Phthalate | 29 |
| Benzoin | 3 |
| Acetone | 40 |
| Toluene | 26 |

Glass cloth is saturated with the solution and then laid on a horizontal flat smooth temporary support surface to permit evaporation of the volatile solvent. The resulting dried resin-filled fabric is limp and sticky. A portion is stripped from the support and suspended in a vertical position; the resinous material soon flows toward the bottom of the specimen, resulting in uneven distribution of resin. The resinous component is easily removed from the fabric by soaking in acetone-toluene mixture.

The remainder of the sample is exposed for 2½ minutes to high intensity ultraviolet radiation from a GE H24 T3 lamp at a distance of about 18 inches and another portion is stripped and suspended as before. No flow of resin is detected after several days at room temperature; the resin remains evenly distributed, and the sample remains sticky to the touch. The resin swells but does not readily dissolve in acetone-toluene.

The remaining portion is further exposed to the ultraviolet radiation for an additional 15 minutes. The resin cures to a hard, non-tacky, fully solvent-resistant state.

Polyester A is identified as a polyester of one mol maleic anhydride, 1.75 mols of isophthalic acid and 2.97 mols of propylene glycol, having an acid number of 27, molecular weight of 1760, and unsaturation value of 0.00138, and obtainable under the trade designation of "Co-Rezyn No. 2".

Polyester B similarly is identified as a polyester of maleic anhydride, adipic acid, o-phthalic acid and diethylene glycol, having an acid number of 26, molecular weight of 2030, and unsaturation value of 0.0011, and obtainable under the trade designation "Co-Rezyn No. 3".

The glass fabric employed in this Example is identified as Style 1528, having a nominal thickness of 7 mils. The resinous solution is poured onto the fabric and allowed to penetrate thoroughly, and the excess is then removed with a squeegee, leaving the fabric fully impregnated but without any obvious surface excess.

EXAMPLE 2

A modified solution is prepared from

| Polyester A of Example 1 | 50.65 |
| --- | --- |
| Polyester B of Example 1 | 16.92 |
| Diallyl phthalate | 16.92 |
| Phenoxy resin solution | 16.92 |
| Benzoin ethyl ether | 1.52 |
| Powdered asbestos | .51 |

The phenoxy resin solution contains 29.5 parts of solid phenoxy resin having a molecular weight of about 30,000 ("Phenoxy PKHH") in 70.5 parts of a mixture of 26 parts toluene and 40 parts acetone.

The components are well mixed together and the volatile solvents removed by heating the mixture to about 250° F with continued mixing. The resulting viscous liquid is used to impregnate and coat glass fabric (Style 181) by dipping in the hot liquid followed by passage between metal squeeze rolls. The treated fabric contains approximately twice its weight of soluble resin composition and has a measured thickness of 25-30 mils. The untreated fabric has a thickness of 9 mils and weighs 8.9 oz./sq. yd.

Samples of the impregnated fabric are placed between transparent Mylar polyester film and silicone-treated paper and held on the surface of a cardboard cylinder of 3 inch diameter which is supported with its axis parallel to two closely spaced 15 watt F 15T8BLB fluorescent tubular lamps at two inches from the surface. The cylinder is slowly rotated. Radiation is continued for a total period of 12 minutes. Treated and untreated samples are thereafter suspended in an oven at 120° F. After 11 weeks, the unexposed sample has lost nearly one-half the original weight of resin, whereas the exposed sample shows very little resin flow and a loss of only about three percent of resin by weight. The exposed sample remains sticky to the touch throughout the entire test period.

Samples are suspended in a mixture of toluene and acetone for 18 hours. The resin dissolves completely from the unexposed sample and from a sample exposed for 6 minutes. In the sample exposed for 12 minutes the resin swells and imparts a slimy, gelatinous feel to the piece but remains with the fabric.

Upon further exposure to UV, the pre-exposed sample soon hardens to a final Barcol hardness value of 80-84 and becomes completely non-tacky.

EXAMPLE 3

| Resin C | 250 |
| --- | --- |
| Diallyl phthalate | 70 |
| Benzoin ethyl ether | 5 |
| Hydroquinone (stabilizer) | 0.05 |

Resin C is a viscous liquid soluble unsaturated polyester condensation product of one mole maleic anhydride and 1.1 mols dipropylene glycol.

The hydroquinone is first dissolved in the warm diallyl phthalate. The Resin C is added and dissolved, followed by the benzoin ethyl ether. The resulting warm clear syrup is applied to Style 1528 glass cloth which is drawn between doctor blades set at an orifice of 0.018 inch, giving a coating weight of 25 grams of resin per square foot (18 grams) of glass cloth. The coated fabric is laid horizontally on silicone-coated release paper, covered with thin smooth transparent Mylar polyester film, and allowed to stand for several days until the sheet becomes essentially clear and transparent through flow of the resin into the voids within the threads of the fabric. Samples are then exposed to radiation as in Example 2 for up to four minutes, exposure being through the transparent film. Both exposed and unexposed samples are tested for resin flow. The unexposed sample loss nearly one-half its resin content when suspended for four days at 110° F. Under the same conditions, no resin flow is detected in the sample exposed for four minutes.

Other specimens, after exposure for 4 minutes and both before and after subsequent storage for several weeks at room temperature but protected from light, are stripped from the silicone-coated paper and pressed against a clean aluminum panel, to which they adhere strongly. They are then exposed through the transparent protective film to radiation from a 250 watt sunlamp for eight minutes. The film is removed. The resin is hard and non-sticky, and the pad in each instance is found to be firmly adhered to the metal surface.

EXAMPLE 4

| | |
|---|---|
| Unsaturated polyester resin | 300 |
| Styrene | 100 |
| Benzoin ethyl ether | 8 |
| Hydroquinone | 0.08 |

The resin is a brittle solid polyester condensation product of one mol maleic anhydride, one mol of phthalic anhydride, and 2.2 mols propylene glycol. The mixture is rather fluid. It is applied to Style 1528 glass cloth at a coating weight of 30 grams per square foot and is found to flow from the vertically suspended test specimen to the extent of nearly one-half its total weight in one day at room temperature. As in the previous Examples, the size of the test specimen is 4 × 4 inches.

A portion of the filled fabric is placed between thin smooth transparent "Tedlar" polyvinyl fluoride films and exposed during four minutes to radiation from the two 15 watt F 15T8BLB fluorescent lamps as in Example 2. The films are removed to expose a still sticky and flexible pad which on being suspended vertically for one day at room temperature shows almost no evidence of resin flow and a weight loss of only about five percent of the resin content. The pad adheres well to clean aluminum and when then exposed to further UV radiation soon hardens to a hard, tough state and is found to be permanently bonded to the metal.

EXAMPLE 5

| | |
|---|---|
| Polyester resin of Example 4 | 250 |
| Diacetone acrylamide | 125 |
| Benzoin ethyl ether | 5 |
| Hydroquinone | 0.16 |

Applied to Style 1528 glass cloth at a coating weight of 2.6 gms/4×4 inch, the resin flows from the vertically suspended sample to the extent of 1.11 grams in the case of the unexposed piece, but only 0.02 grams in that of a piece exposed during six minutes under the conditions described in Example 2. In this test the samples are suspended for three days at 130° F. The exposed sample is sticky, adheres well to clean aluminum, and cures to a hard tough state on further exposure to UV, with good bonding to the metal.

EXAMPLE 6

| | |
|---|---|
| Resin mixture | 400 |
| Benzoin ethyl ether | 8 |
| Hydroquinone | 0.1 |

The resin mixture contains about 25% of styrene in a curable glycol isophthalate polyester and is available under the trade designation "Aropol 7210" as a resilient general purpose polyester resin. The acid number of the mixture is about 17.

The mixture is applied to glass cloth and exposed for up to four minutes as in Example 2. At four minutes the sample loses no weight when suspended for one day at 130° F. but adhesion to aluminum is decreased. At two minutes of exposure the sample adheres well to aluminum and loses only 0.1 gm. in the suspension test.

Other commercially available resins and resinous mixtures giving equivalent resistance to flow under similar test procedures include "Atlac 382E" (condensation product of ethoxylated bisphenol A and fumaric acid as described in U.S. Pat. No. 2,634,251), "Hetron 103" (mixture of diallyl phthalate and fire-retardant polyester resin of acid number 19), "Koplac" (mixture of one part diallyl phthalate and three parts high reactivity, high viscosity polyester resin with acid number 16-28), and "Epocryl U-12" (condensation product of methacrylic acid and the diglycidyl ether of bisphenol A). In all cases, fibrous glass pads weighing about 2 grams per 16 sq. in. and impregnated with from about 2 to about 4 grams of resinous mixture, i.e., sufficient to provide strong surface stickiness without surface flooding, lose a large proportion of the resin when suspended vertically at room or slightly elevated temperatures for up to a few days; whereas very little or no loss of resin occurs with pads similarly prepared but additionally exposed to ultraviolet radiation in amount just sufficient to cause preliminary gelation of the resin, i.e., as exemplified by an exposure of between one and twelve minutes to the radiation from two 15 watt F 15T8BLB fluorescent lamps at a distance of two inches. These pads find particular utility in the repairing of reinforced plastic structures.

I claim:

1. Method of making a stable exudation-resistant resin-impregnated adherent fibrous sheet material which when pressed against a receptive substrate and then exposed to actinic radiation will cure to a hard, non-tacky, solvent-resistant state and remain firmly adhered to said substrate, comprising impregnating a porous, fibrous mat with a radiation-curable sticky fluid resinous composition comprising unsaturated polyester, unsaturated liquid monomer copolymerizable therewith, and an acyloin photoinitiator, said resinous composition being present in an amount sufficient to provide the impregnated mat with a sticky surface, enclosing the impregnated mat between a transparent film and another protective supporting web, and then exposing the product to a non-reaction-sustaining amount of actinic radiation sufficient to gelatinize, but not to rigidify, the resinous composition wherein said composition remains in a stable condition substantially free of reaction-sustaining free radicals in which a portion of the composition swells, but does not dissolve when suspended for 18 hours in 1:1 acetone-toluene and in which it exhibits a decrease in penetration value of approximately one-half.

2. A method according to claim 1 wherein the non-reaction-sustaining amount of actinic radiation is about 2 watts per square inch for a period of about 1 to 12 minutes.

3. A stable exudation-resistant resin-impregnated sticky fibrous sheet material capable, when pressed against a receptive substrate and then exposed to actinic radiation, of curing to a hard, non-tacky, solvent-resistant state and of then remaining firmly adhered to said substrate, comprising a porous, fibrous mat impregnated with a gelatinized radiation-curable sticky fluid resinous composition comprising unsaturated polyester, unsaturated liquid monomer copolymerizable therewith, and an acyloin photoinitiator, said composition being substantially free of reaction-sustaining free radicals, wherein at least a portion of the resinous composition in said sheet swells but does not dissolve when the sheet is suspended for 18 hours in a 1:1 acetone-toluene mixture, said sheet material being enclosed between a transparent film and a second protective supporting web.

4. A sheet material according to claim 3 wherein said porous, fibrous mat comprises glass fibers.

5. A sheet material according to claim 3 wherein said porous, fibrous mat comprises polyester fibers.

6. A sheet material according to claim 3 wherein said porous, fibrous mat comprises nylon fibers.

7. A method according to claim 1 wherein the protective supporting web is a silicone-treated paper sheet.

8. A sheet material according to claim 3 wherein the protective supporting web is a silicone-treated paper sheet.

9. A sheet material according to claim 3 wherein the acyloin photoinitiator is benzoin.

10. A sheet material according to claim 3 wherein the acyloin photoinitiator is benzoin ethyl ether.

* * * * *